July 3, 1934.  G. H. ALVEY  1,965,403
ASPHALT EXPANSION JOINT
Filed Dec. 23, 1931
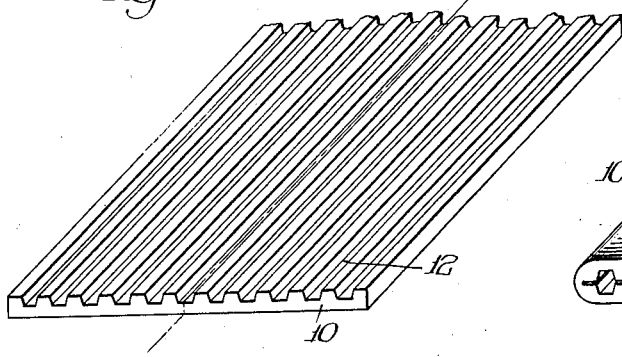
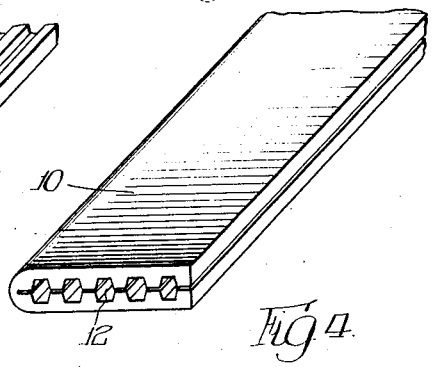
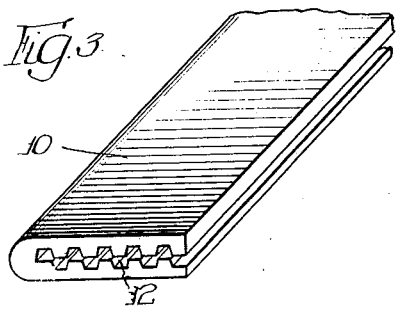
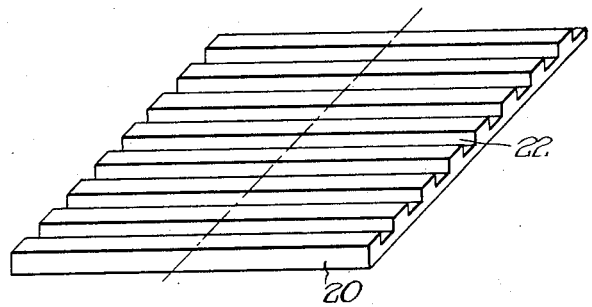
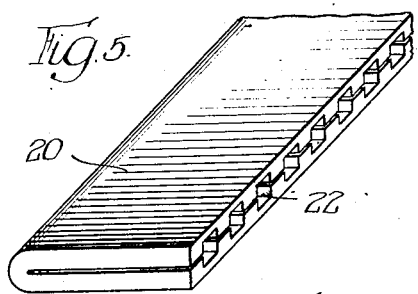
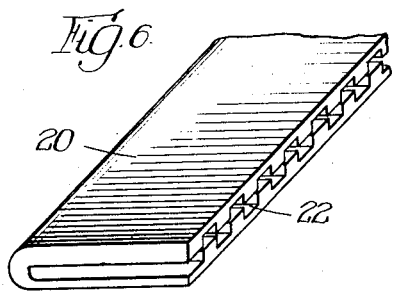
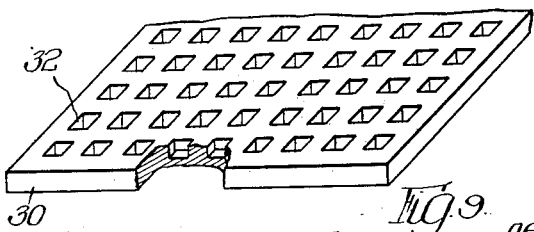
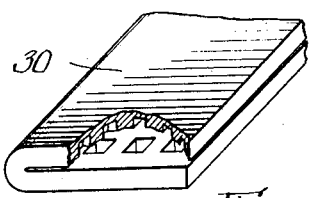
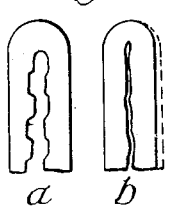
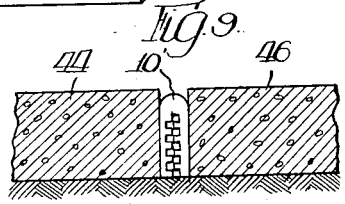
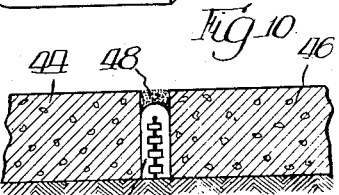
Inventor:
Glenn H. Alvey,
By Wilkinson, Huxley, Byron & Knight
Attys.

Patented July 3, 1934

1,965,403

UNITED STATES PATENT OFFICE 1,965,403

ASPHALT EXPANSION JOINT

Glenn H. Alvey, San Antonio, Tex., assignor to Uvalde Rock Asphalt Company, San Antonio, Tex., a corporation of Texas Application December 23, 1931, Serial No. 582,770

2 Claims. (Cl. 94—18)

The invention relates to a new and useful improvement in expansion joint fillers and particularly to fillers of an asphaltic composition. Expansion joints are provided for the purpose of permitting expansion and contraction to take place between rigid or semi-rigid bodies so that distortion of the bodies by reason of expansion and occasionally by contraction can be prevented. In street and road paving the joint provided between sections can not be left open and unprotected since it is obvious that the space will soon fill up with foreign material and cease to serve its purpose. Also, it is desirable that the joint be filled so as to prevent any seepage of water under the pavement. It has become generally accepted that asphaltic compositions form the best fillers for expansion joints in street and road paving but even these compositions have heretofore been objectionable since they are readily displaced from the joint upon excessive expansion or even moderate expansion of the sections. Various attempts have been made to correct this objectionable feature by mixing with the asphaltic composition cork, rubber or other compressible materials, but of these attempts only a few have been fairly successful.

One of the objects of the present invention, therefore, is to provide a pre-molded joint filler of an asphaltic composition which will have a high degree of compressibility and will resist to a much greater degree than the fillers now in use the tendency to be displaced from the joint upon expansion of the sections or bodies as the case may be.

A further object of the invention is to provide a filler for expansion joints which will be formed in sheets having a plurality of grooves, indentations and the like therein, and which will be folded upon itself prior to being inserted in the joint.

With these and various other objects in view, the invention may consist of certain novel features of construction and operation as will be more fully described and particularly pointed out in the specification, drawing and claims appended hereto.

In the drawing which illustrates an embodiment of the device and wherein like reference characters are used to designate like parts—

Figure 1 is a perspective view of one form of pre-molded strip, the same having longitudinal grooves therein;

Figure 2 is a perspective view showing the strip in folded form, the longitudinal grooves being positioned in alignment;

Figure 3 is a perspective view of the strip in folded form wherein the longitudinal grooves interlock;

Figure 4 is a perspective view of a pre-molded strip provided with transverse grooves;

Figure 5 is a view of the strip in folded form with the grooves in alignment;

Figure 6 is a view similar to Figure 5 but showing the grooves of the pre-molded strip interlocking;

Figure 7 is a perspective view of a pre-molded strip having indentations or recesses in place of grooves;

Figure 8 is a perspective view of the strip in folded form;

Figure 9 is a vertical sectional view showing a section of paving or the like with the filler of the present invention associated therewith;

Figure 10 is a view similar to Figure 9 and showing a completed expansion joint according to the present invention; and Figure 11 is a vertical transverse section showing the filler of the present invention in expanded or contracted positions.

To accomplish the above desired objects the filler is formed of an asphaltic composition containing asphalt, a mineral filler and fibers so proportioned as to make a plastic material having sufficient strength to hold its shape except when subjected to excessive pressure. The composition should be sufficiently plastic at normal temperatures as to bend very readily when molded into sizeable pieces but which will not be distorted by its own weight, that is to say, a piece of the molded composition should overhang without support for as much as one or two inches without sagging from its own weight. The asphaltic composition is molded while hot into a flat sheet containing the desired grooves or indentations on one side thereof. The sheet is cut into the desired length and width depending on the particular size of filler desired. While the sheet is still hot and pliable it is folded upon itself in a direction so that the grooves or indentations are located adjacent each other and are on the inside of the fold.

In order to better understand the particular construction of the present pre-molded joint filler attention is directed to the drawing wherein Figure 1 illustrates a pre-molded strip designated 10 containing a plurality of grooves 12 running longitudinally of the strip. In Figure 4 the pre-molded strip 20 has grooves 22 therein extending transversely of the strip and since in order to form a length of filler the strip is folded upon itself it will be seen that as shown in Figures 2 and 5 that the grooves are located adjacent and in alignment.

A modification of this construction of the filler is possible by folding the strip so as to displace the grooves of one side with respect to those on the other, forming, as shown in Figures 3 and 6, an interlock.

Still another modified construction of filler is possible by providing the asphaltic sheet 30, Figure 7, with rectangular recesses or depressions 32 which, when the sheet is folded upon itself, may or may not be located in alignment, the operation of the filler in either case being substantially the same.

For purposes of explaining the method of installation of the present type of filler it will be assumed that the bodies 44 and 46 represent sections of a pavement which have been laid with a space therebetween for permitting expansion of the sections. The filler is placed in the space or joint with the open side being located downward, as shown in Figure 9. In some instances it has been found desirable to position the filler slightly below the surface of the pavement and to then fill the depression or space above the filler with pure asphalt designated 48, Figure 10, which may be poured while hot or when emulsified with water. When the pavement or sections thereof expand the filler will be compressed but in the present case instead of being forced entirely out of the joint will assume a completely closed form, the excess being forced into the unoccupied grooves. Upon contraction of the pavement the two sides of the filler will be pulled apart or separated, leaving an open space to allow for further expansion and contraction. It will be obvious in those modifications shown in Figures 2, 5 and 8 that the grooves and tongues will be forced out of shape and the filler will ultimately take the form such as illustrated in Figure 11, wherein $a$ shows the shape and contour of the grooves or recesses after several expansions and contractions of the pavement has taken place, while $b$ shows the form assumed by the filler when the sections of the pavement are expanded.

In the modifications illustrated in Figures 3 and 6 the tongues and grooves, since they have interfitting engagement, will not be forced out of shape as readily as in those constructions where the grooves are aligned and accordingly in these designs the tongues and grooves have been found to last for a considerable length of time without appreciable distortion.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. A filler for expansion joints comprising a sheet of asphaltic material, grooves provided in one surface of the sheet and extending transversely of the same, said sheet being folded upon itself to form the complete filler, the grooved surface being located inside the fold.

2. An asphaltic filler for expansion joints comprising a sheet of material of an asphaltic composition, transverse grooves provided in one surface of said sheet, said sheet being folded to form the complete filler, the grooved surface being located on the inside of the fold with opposed grooves in substantial alignment.

GLENN H. ALVEY.